US006842445B2

(12) United States Patent
Ahmavaara et al.

(10) Patent No.: US 6,842,445 B2
(45) Date of Patent: Jan. 11, 2005

(54) RETRANSMISSION METHOD WITH SOFT COMBINING IN A TELECOMMUNICATIONS SYSTEM

(75) Inventors: Kalle Ahmavaara, Helsinki (FI); Jukka Vialén, Espoo (FI); Fabio Longoni, Espoo (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 714 days.

(21) Appl. No.: 09/739,094

(22) Filed: Dec. 13, 2000

(65) Prior Publication Data

US 2004/0013105 A1 Jan. 22, 2004

Related U.S. Application Data

(63) Continuation of application No. PCT/FI00/00307, filed on Apr. 12, 2000.

(30) Foreign Application Priority Data

Apr. 13, 1999 (FI) .................................................. 990812
May 14, 1999 (FI) .................................................. 991106

(51) Int. Cl.$^7$ ................................................ H04J 3/24
(52) U.S. Cl. ........................ 370/349; 370/338; 714/749
(58) Field of Search .................. 370/349, 395.1–395.62, 370/280, 332–338, 347, 389, 474, 276–282, 310, 318; 714/748, 749

(56) References Cited

U.S. PATENT DOCUMENTS 5,319,712 A 6/1994 Finkelstein et al.
5,483,545 A 1/1996 Darmon et al.

(List continued on next page.)

FOREIGN PATENT DOCUMENTS

| EP | 0938207 A2 | 8/1999 |
| WO | WO 00/28744 | 5/2000 |

OTHER PUBLICATIONS

Performance of Hybrid–ARQ Coding Schemes over M–QAM Equalized Mobile Radio Channels, Gutierrez et al, IEEE 1999, pp. 2918–2922.*

(List continued on next page.)

*Primary Examiner*—Douglas Olms
*Assistant Examiner*—Van Kim T. Nguyen
(74) *Attorney, Agent, or Firm*—Squire, Sanders & Dempsey L.L.P.

(57) ABSTRACT

An automatic repeat request mechanism (such as Type II/III hybrid ARQ) which includes (soft or hard) combining of initially transmitted and retransmitted versions of a packet, is provided for retransmission of erroneous packets. According to the present invention, in association with each retransmission, there is outband signaling from a transmitter to a receiver that unambiguously indicates when, e.g. the exact time or physical location, the first transmission of the packet was carried out, so that it is possible to combine the retransmitted version with the previous version(s) of the packet. Soft combining requires that the initial packet and the retransmitted packet be identical. In an embodiment of the invention, in order to overcome this problem, the information that needs to be changed between the initial transmission and the retransmission(s) of a packet is sent outband with other outband signaling information. Thus, the retransmitted packet can be maintained unchanged and the requirement for identical packets in soft combining is met.

36 Claims, 3 Drawing Sheets

U.S. PATENT DOCUMENTS

| | | | | |
|---|---|---|---|---|
| 5,694,473 | A | | 12/1997 | Bright et al. |
| 5,809,148 | A | | 9/1998 | Doberstein et al. |
| 5,875,292 | A | | 2/1999 | Taketsugu |
| 5,881,069 | A | * | 3/1999 | Cannon et al. ............. 714/748 |
| 5,983,382 | A | * | 11/1999 | Pauls ......................... 714/744 |
| 6,021,516 | A | * | 2/2000 | Okajima et al. ............ 714/748 |
| 6,161,207 | A | * | 12/2000 | Lockhart et al. ............ 714/758 |
| 6,247,150 | B1 | * | 6/2001 | Niemela ..................... 714/701 |
| 6,317,418 | B1 | * | 11/2001 | Raitola et al. .............. 370/278 |
| 6,335,933 | B1 | * | 1/2002 | Mallory ...................... 370/394 |
| 6,532,563 | B2 | * | 3/2003 | Nobelen ..................... 714/751 |
| 6,535,979 | B1 | * | 3/2003 | Vialen et al. ............... 713/163 |
| 6,549,753 | B1 | * | 4/2003 | Rinne ........................ 455/3.02 |
| 6,556,833 | B2 | * | 4/2003 | Vialen et al. ............... 701/207 |
| 6,563,826 | B1 | * | 5/2003 | Shikama ..................... 370/394 |
| 6,581,176 | B1 | * | 6/2003 | Seo ........................... 714/749 |
| 6,611,495 | B1 | * | 8/2003 | Meyer et al. ............ 370/230.1 |
| 6,631,127 | B1 | * | 10/2003 | Ahmed et al. .............. 370/349 |
| 6,671,849 | B2 | * | 12/2003 | Tripathi et al. ............. 714/746 |
| 6,678,249 | B2 | * | 1/2004 | Toskala et al. ............. 370/236 |
| 6,678,523 | B1 | * | 1/2004 | Ghosh et al. ............... 455/442 |
| 6,683,850 | B1 | * | 1/2004 | Dunning et al. ............ 370/231 |
| 6,697,347 | B2 | * | 2/2004 | Ostman et al. ............. 370/335 |
| 6,704,898 | B1 | * | 3/2004 | Furuskar et al. ............ 714/751 |

OTHER PUBLICATIONS

Sequential Decoding with an Efficient Partial Retransmission ARQ Stragey, Kallel et al, IEEE Transaction on Communications, vol. 39, No. 2, Feb. 1991, pp. 208–213.*

Practical Impementations of a Mobile Data Link Protocol with a Type II Hybrid ARQ Scheme and Code Combining, Bakhtiyari et al, IEEE 1993, pp. 774–777.*

A Modified Selective–Repeat Type–II Hybrid ARQ System and Its Performance Analysis, Wand et al, IEEE Transactions on Communications, vol. 31, No. 5, May 1983, pp. 593–608.*

M.M. Darmon, et al, "*A hybrid FEC–ARC communication system for zero–error digital transmissions on the troposcatter channel*", *IEEE*, pp. 93–97, vol. 1, Sep. 30– Oct. 3, 1990.

B. Aulia, et al, "*Distributed control for a high speed optical customer premises network,*"XIII International Switching Symposium, 1990, vol. 5, 1990, pp. 119–126, see abstract section 3.2, 3.4 International Search Report for PCT/FI00/00307.

* cited by examiner

| CFN cycles | CFN | Position in TBS | Polling bit |

RETRANSMISSION METHOD WITH SOFT COMBINING IN A TELECOMMUNICATIONS SYSTEM

This application of PCT/FI00/00307 filed Apr. 12, 2000.

FIELD OF THE INVENTION

The invention relates to retransmission mechanisms using soft combining, especially in association with ciphering, in telecommunication systems, and particularly in wireless telecommunications systems.

BACKGROUND OF THE INVENTION

A wireless communications system refers generally to any telecommunications system which enables wireless communication between the users and the network. In mobile communications systems, users are capable of moving within the service area of the system. A typical mobile communications system is a Public Land Mobile Network (PLMN).

At present, third generation mobile systems, such as the Universal Mobile Communication System (UMTS) and the Future Public Land Mobile Telecommunication System (FPLMTS), later renamed IMT-2000 (International Mobile Telecommunication 2000), are being developed. The UMTS is being standardized at ETSI (European Telecommunication Standards Institute), whereas ITU (International Telecommunication Union) is defining the IMT-2000 system. The radio interface of 3G mobile systems is likely to be based on a wideband CDMA (code division multiple access), and therefore third generation systems are often referred to as Wideband CDMA systems (WCDMA). These future systems are basically very alike.

FIG. 1 illustrates a telecommunications network in which the invention is applicable. The telecommunications network could be e.g. a third generation cellular mobile network, such as the UMTS. The telecommunications network comprises a first end node, such as a mobile station MS (referred to as a User Equipment UE in the UMTS terminology), and a second end node, such as a Radio Network Controller RNC1, RNC2. The network may also comprise several middle nodes, such as Base Stations BS1 to BS4. Information to be sent between the end nodes is formatted as frames (e.g. RLC PDUS). There may be several (two or more) parallel connections between the end nodes via several middle nodes, enabling macrodiversity, diversity combining or soft handover.

A copending Finnish patent application 982399, filed on Nov. 5, 1998, by the same Applicant, discloses a new synchronization mechanism, referred to as a Connection Frame Number (CFN) scheme, for avoiding synchronization problems especially in macrodiversity implementations. According to the current vision of UMTS, some traffic overhead is eliminated by not transmitting frame numbers with the frames (i.e. on a traffic channel) over the radio interface Uu. Instead, in the BS to UE direction, the frame numbers are broadcast to all mobile stations simultaneously, and in the BS to RNC direction, the base stations add the frame numbers in a modulo-p sequence where the currently proposed value for p is 72. In other words, the frame numbers are repeated cyclically: 0, 1, . . . , 71, 0, 1, etc. The base stations are not synchronized with each other. Therefore, the frame numbers are relative and, indeed as such, they are meaningless without at least implicit information about the timing reference on which the frame numbers are based. Because the frame number is not transmitted over the radio interface, and because the base stations use different timing references, a frame N sent by the mobile station to the BS1 and BS2 may be forwarded by the BS1 as frame N' to the RNC, whereas BS2 would send the same frame as frame N" to the RNC. As a consequence, diversity combining at the RNC fails.

In the new mechanism suggested by FI982399, and also accepted in present UMTS scenarios, a connection-specific timing reference (called CFN), which is common to all nodes involved in the connection, is established so as to enable any middle node (BS) to determine and compensate for an offset between its local timing reference and the CFN. The end nodes (RNC and UE) agree the CFN at the beginning of the connection by means of outband signaling. The CFN is tied to the timing of a broadcast control channel (BCCH) in the cell, i.e. it is incremented every 10 ms. A number of RLC PDUs are incorporated into a larger data unit, a Transport Block Set (TBS), that is transmitted in one interleaving period (a multiple of 10 msec radio frames). Thus, the CFN is 'transmitted' through the transport channel between the UE and the RNC, i.e. the CFN is incremented locally both at the UE and the RNC, associated with each TBS. In case of interleaving periods longer than 10 msec (i.e. the TBS extends over two or more radio frames), the CFN refers to the first radio frame utilized for the transmission of the interleaving block.

To meet the requirements for the length of the frame number used for ciphering, an extension of the CFN, a Hyper Frame Number HFN, is provided. The length of the HFN is at least 25 bits so that the total length of HFN+CFN is at least 32 bits. The HFN is initialized to a common value in the UE and SRNC, and then it is incremented at every completed CFN cycle, i.e. every 72 msec. As a result, a configuration as shown in FIG. 2 is provided for frame numbering and synchronization.

The above Finnish patent application FI982399 further proposes, as is accepted also in the present UMTS scenarios, to use the UEFN (i.e. CFN+HFN) as a cipher key, since the length of CFN+HFN is sufficient for reliable ciphering. Other inputs to the ciphering algorithm may be a ciphering key Kc, a Bearer ID and a Direction, as illustrated in FIG. 3. Kc:s are calculated in the UE and SRNC during the authentication procedure. The direction parameter defines in which direction the data is sent (Uplink/Downlink). The bearer ID (RAB ID) is a radio access bearer or a signaling link specific parameter, unique within one RRC connection. It is used as input parameter for ciphering to ensure that the same ciphering mask is not applied to two bearers that have the same Kc and are transmitted with the same UEFN (in case of L1 or MAC multiplexing). The ciphering algorithm generates a ciphering mask. It is likely that radio interface ciphering in the UMTS will be a MAC functionality which allows the encryption/decryption of MAC SDUs (RLC PDUs) on basis of XOR combining with the ciphering mask. The main benefit of this ciphering solution is the use of one and the same mechanism for all channel types and bearer types.

In the initialization the UE (acting as a master) sets its own reference, UEFN, for frame numbering. The HFN is initialized before ciphering is started, e.g. during setup of the RRC connection or during the ciphering mode setting procedure, and is maintained (run) all the time the UE is in RRC connected mode. The HFN is preferably initialized to a value that is hard to predict by a fraudster. The reason why the HFN should not be initialized to a fixed value (e.g. 0) is to prevent the reuse of the same ciphering masks within too short a period of time in case the Kc is not changed.

The basic unit for ciphering is one RLC PDU, i.e. (in uplink direction) the UE ciphers each RLC PDU with the respective UEFN in the MAC layer prior to sending the frame to the RNC. The MAC layer in the RNC is aware of the UEFN (in accordance with the principles of the CFN concept) used by the UE, and is able to decipher the received frame. As a consequence, the ciphering mask is changed as the CFN or HFN is incremented.

An improvement of CFN-based ciphering is described in a copending Finnish patent application 990499, filed on Mar. 8, 1999, by the same Applicant.

Problems may arise, when "CFN ciphering" is used with some of the Automatic Repeat Request (ARQ) techniques. Generally, the ARQ is a transmission method in which error correction is based on retransmission. A very basic ARQ scheme includes only error detecting and retransmission capabilities. If a packet is found to have errors after decoding, this packet is discarded and retransmission is requested. The source then retransmits an exact copy of that packet. A Hybrid ARQ is a transmission scheme which combines error detection/correction (such as Forward Error Correction, FEC) and retransmission of the erroneous frame. Three types of hybrid ARQ have been defined:

Type I: Type I hybrid ARQ is an Adaptive Coding Rate (ACR) method. The main idea behind the ACR ARQ methods is to vary the coding rate for error correction according to system constraints such as the signal-to-noise ratio in a given environment. With ACR ARQ, whenever a data RLC-PDU is received with an uncorrectable error pattern, the RLC-PDU is discarded and a request for retransmission is sent back through a return channel to the transmitter. The transmitter then resends an exact copy of the original RLC-PDU.

Type II: Type II hybrid ARQ belongs to the Adaptive Incremental Redundancy (AIR) ARQ schemes. In AIR ARQ schemes, a RLC-PDU that needs to be retransmitted is not discarded, but is combined with some incremental redundancy bits provided by the transmitter for subsequent decoding. The advantages of Type II hybrid ARQ, as compared with Type I hybrid ARQ, are that if the interference distribution across a radio cell is such that a significant fraction of RLC-PDUs will be received correctly even with a low initial FEC code rate, then a higher throughput can be achieved. Further, since repeat transmissions can be soft-combined, there is an increase in the probability of correctly decoding the RLC-PDU.

Type III: The retransmitted packed may be combined with the previous versions, if available, but each version contains all the information necessary for correct reception of the data. It does not offer obvious throughput gains when compared with Type I hybrid ARQ, but the combining of consecutive transmissions offers a better decoding probability than repeat transmissions with Type I hybrid ARQ and may be a significant benefit.

Type I hybrid ARQ with soft combining: With Type I hybrid ARQ, it is also possible to store the erroneous packet in the receiver and combine it with the retransmitted packet. This can be considered as incremental redundancy in the form of a repetition code, and therefore this can be considered as a special case of Type II/III hybrid ARQ.

All the hybrid ARQ schemes using soft combining of different transmissions, i.e., Type II and Type III as well as Type I hybrid ARQ with soft combining, require that information about which packets to combine has to be signaled outband in order to be able to associate and soft-combine different versions of the packet. This information can be the PDU number of the packet, for example. The receiver will combine the versions of the packet that are indicated by the outband signaling, e.g. to have the same PDU number. 'Outband' means that this information is protected with a separate error detection code (e.g. CRC) and outband information is usually assumed to be more reliable than inband data. A separate, more reliable channel can be used (with more power or a more powerful error correction scheme) or a better protected header with its own CRC. It is also possible to send the data 'inband' (using the same channel as the data does) but with better protection. The problem is that the above described CFN-based ciphering method does not work together with hybrid Type II/III ARQ. Since Type II/III hybrid ARQ requires that retransmitted data is exactly identical to the first transmission attempt (to enable soft combining), the basic problem with CFN-based ciphering is how the transmitted knows which CFN should be used in retransmissions and how the receiver knows which CFN should be used for deciphering if retransmissions are needed before data is received correctly. With the 'normal' CFN-based ciphering method, the retransmitted RLC PDU uses a ciphering mask different from the initial transmission, which makes the soft combining of the two PDU versions on the receiver side (on L1, below ciphering) impossible. On the other hand, if the ciphered PDU is stored on the L1 layer for retransmission (not reciphered when retransmitted), then soft combining on the receiver side is possible, but the problem is that deciphering is not possible, since the receiver does not know the CFN of the originally transmitted PDU. As a consequence, CFN-based ciphering cannot be used for all types of services in the communication system, but different ciphering methods are needed for bearer services utilizing Type II/III hybrid ARQ.

Similar problems can be encountered in any communications system using an ARQ with soft combining, even without CFN-based encryption.

DISCLOSURE OF THE INVENTION

An object of the present invention is to enable ARQ operation which combines initial and retransmitted versions (e.g. incremental redundancy ARQ) when soft combining information is not transmitted with initial transmission.

A further object of the present invention is to enable ARQ operation, such as Type II/III hybrid ARQ, which combines initial and retransmitted versions in association with connection frame number-based ciphering.

These and other objects are achieved with a method, a system and transmitter and receiver units which are characterized by what is disclosed in the attached independent claims. Preferred embodiments for solving the other two problems are disclosed in the attached dependent claims.

An automatic repeat request (ARQ) mechanism (such as Type II/III hybrid ARQ), which includes (soft or hard) combining of initially transmitted and retransmitted versions of the packet, is provided for retransmissions of erroneous packets. Herein the data packet is understood as a data entity whose errors are detected on basis of the same error detection code, e.g. a cyclic redundancy code (CRC). For example, a data packet may consist of an MAC/RLC header, data and a CRC. If the packet is detected to be by mistake, no part of the packet can be used, i.e. also the header is unreliable. According to the present invention, each retransmission comprises outband signaling from a transmitter to a receiver that unambiguously indicates when, e.g. the exact time or physical location, when the packet was transmitted for the first time, so that it is possible to combine the retransmitted version with the previous version(s) of the packet. Herein outband signaling means that another (outband) channel, more reliable, is used for transmitting the information. This other channel is used only when packets are retransmitted. In other embodiments, "outband signaling" can be transmitted in the same channel with the data, but with better error protection (e.g. higher channel coding).

The advantage of the invention is that no additional header information or outband signaling is needed when the packets go through the first (initial) transmission. The additional soft combining information is sent only when it is really needed. This saves transmission resources. This applies both in communications systems in which the frame number is transmitted in the data packets and in communications systems using the connection frame number (CFN)-based frame synchronization.

The soft combining of several transmissions when erroneous packets are not discarded requires that the transport blocks (e.g. MAC PDUs) to be combined are identical. More particularly, the encoded versions of the block need not be identical, but the original data used for encoding has to be identical. For example, the MAC protocol data unit (PDU) contains, in addition to the data, also a MAC header and an RLC header in third generation mobile communications systems. Soft combining may now require that the retransmitted MAC PDU has to be identical to the originally transmitted MAC PDU, and therefore, also the RLC and MAC headers need to be identical. However, there may be some header information that may change between original transmission and retransmission, such as a polling bit used to request an acknowledgement message. In some radio systems a transmission power level of the next transmission burst is also given in the transmitted packet and this information may change between the original transmission and retranmission(s) of the packet. There is now a conflict between the soft combining requirement of identical packets and the need for changed header information. In an embodiment of the invention, in order to overcome this problem, the information that needs to be changed between the initial transmission and the retransmission(s) of a packet is sent outband with the other outband signaling information indicating the initial version of the packet. Thus, the retransmitted packet can be maintained unchanged and the requirement that packets are identical in soft combining is met. Upon reception of a retransmitted packet, the information which may be subject to change is read from the outband signaling and overrides the corresponding inband information in the received packet. In the initial (first) transmission of the packet, only the inband information is transmitted and used, i.e. the inventive outband signaling information is transmitted only in association with the retransmissions of the packet, if any.

In a preferred embodiment of the invention, a initial transmission of packets is performed using a Connection Frame Number-based synchronization wherein, after initialization of a connection, no frame numbers are transmitted but the transmitter and receiver independently count the Connection Frame Number (CFN) (and preferably also an extension thereof, the Hyper Frame Number (HFN)), for each transmitted and received frame, on basis of a connection-specific timing reference which is common to the transmitter and the receiver, and to any intermediate node(s), of the connection. Each packet is ciphered in the transmitter and deciphered in the receiver according to the locally counted UEFN of the respective packet. An automatic repeat request (ARQ) mechanism (such as Type II/III hybrid ARQ), which includes soft combining of initially transmitted and retransmitted versions of the packet, is provided for retransmissions of erroneous packets. According to the present invention, any packet to be retransmitted is ciphered according to the same UE Frame Number used for ciphering the initially transmitted (first) version of the packet. Further, every time a packet (PDU) is retransmitted, there is outband signaling from a transmitter to a receiver indicating the exact time when the first version of the packet was transmitted, so that it is possible to combine the retransmitted version with the previous version(s) of the packet and also decipher the combined packet in the receiver. If different encoding is used for transmissions, i.e. the encoded versions of the blocks are not identical, the version of the packet should also be indicated by outband signaling (indicating which decoding should be used).

Alternatively, other ciphering methods can be employed instead of the CFN-based ciphering method in the present invention. Other type of frame numbering may be also used instead of the CFN. Independently of the ciphering solution or frame numbering adopted, the invention has the advantage that there is no need for any outband signaling at the time of the transmission of the first version of a packet.

A second benefit is the possibility to use Hybrid Type II/III ARQ with CFN-based ciphering, or other frame number-based ciphering, which means that one ciphering method can be used for all types of services. The advantage of having one single ciphering method is a less complex system (in particular, there is no need to initialize and maintain separate ciphering counters for each parallel bearers).

BRIEF DESCRIPTION OF THE DRAWINGS

In the following the invention will be described in greater detail by means of the preferred embodiments with reference to the accompanying drawings, in which.

PREFERRED EMBODIMENTS OF THE INVENTION

In the following, the preferred embodiments of the invention are described as implemented in the UMTS system. The invention is applicable to any communications system using an ARQ with (soft) combining. The invention is especially well applicable when encryption is employed with the (soft) combining ARQ. The most promising field of application is a system using CFN-based encryption, or other frame number-based ciphering, in association with soft combining.

Figure 4:
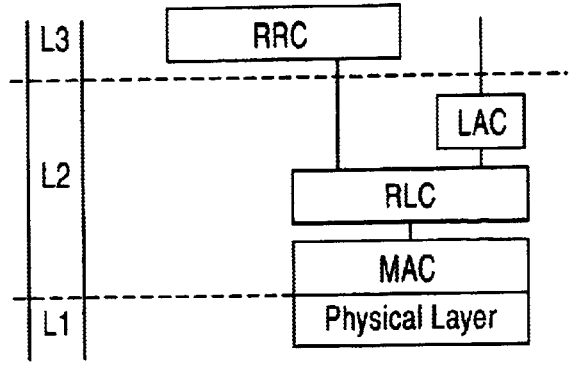
FIG. 4 illustrates an example of the protocol structure which may be used in the UMTS system.

FIG. 4 gives an overview of the assumed protocol environment in the third generation mobile systems. Categorically, we can find three layers in the ISO/OSI layer model (International Standards Organization/Open Systems Interconnection): a physical layer (Layer 1, L1), a data link layer (Layer 2, L2), and a network layer (Layer 3, L3). Layer L3 includes the Radio Resources Control (RRC) protocol and upper user plane protocols (any upper layer transmission and signaling protocols). L2 includes the Link Access Protocol LAC, Radio Link Access Protocol RLC and Media Access Control MAC.

Figure 1:
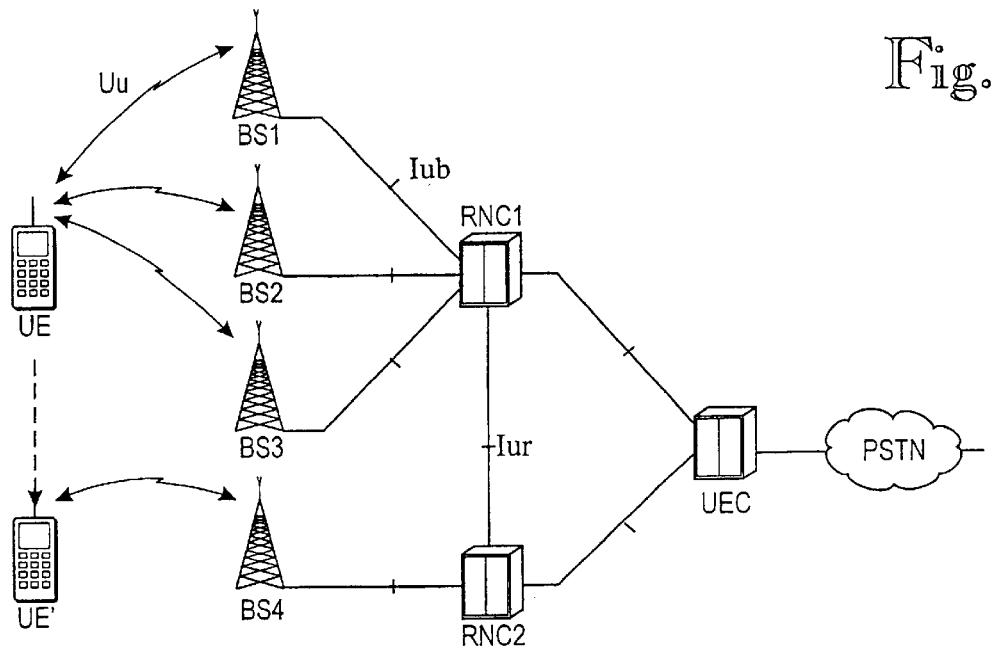
FIG. 1 illustrates a telecommunications network in which the invention is applicable.
Figure 2:
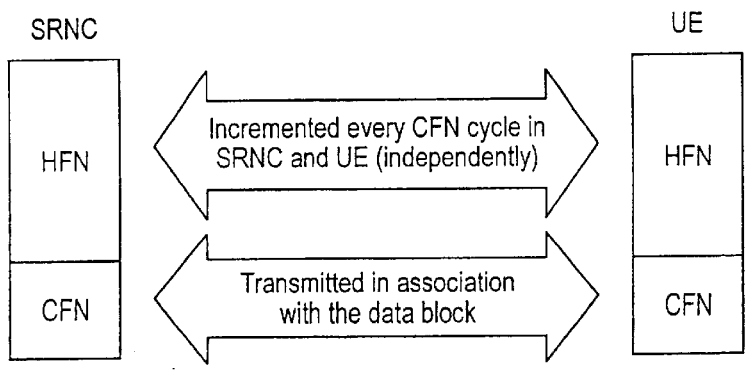
FIG. 2 is a block diagram which illustrates counting of the CFN and HFN at the UE and RNC in CFN-based frame synchronization.
Figure 3:
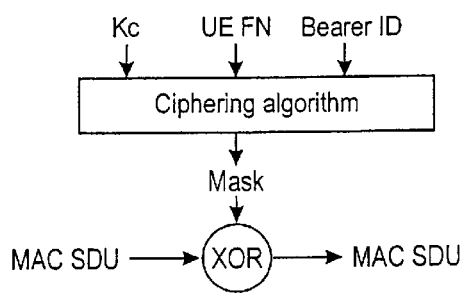
FIG. 3 is a block diagram illustrating a CFN-based ciphering and deciphering unit and the input parameters thereof.

The preferred embodiment of the invention will be described in the communications system shown in FIG. 1, without any intention to restrict the invention thereto. The frame numbering scheme is the above CFN-based frame synchronization (Finnish patent applications 982399 and 990499 are incorporated herein by reference), but other frame synchronization methods may alternatively be used, e.g. the method described as prior art in Finnish patent application 982399 The CFN-based ciphering described above with reference to FIG. 3 is also used, but other encryption methods may be used as well. Further, a Type II/III hybrid ARQ is employed, but any other ARQ with soft (or hard) combining can be used instead.

The basic data packet is an RLC PDU. The data packets are transmitted through a traffic channel, such as the Dedicated transport Channel (DCH), Downlink Shared Channel (DSCH) or Uplink Shared Channel (USCH) in UMTS. In the example we assume that the RLC PDU itself contains the PDU number or that the receiving RLC is by some other means able to calculate which PDU numbers are missing, thus retransmission requests are carried out using RCL PDU numbers. The transmitter side MAC entity keeps a table for RLC PDU numbers and corresponding UEFN information on the transmitted RLC PDUs. Upon receiving a retransmission request with a RLC PDU number, the transmitter retrieves the UEFN used for this RLC PDU number in the initial transmission and uses the retrieved UEFN for ciphering the RLC PDU to be retransmitted. Then when RLC PDU is retransmitted, the UEFN information used for ciphering is signaled as outband to the receiver, as will be explained in more detail below.

In accordance with the present invention, an outband channel associated with the actual data channel is provided for carrying the information required for soft combining and deciphering of the initial and retransmitted version(s) of the RLC PDU. It can be either FACH, a separate DCH or a more efficiently error correction-coded part of the same DCH where the data is transmitted. In accordance with the invention, it is unnecessary to transmit any outband information with the initial transmission, since the UEFN information can be obtained 'implicitly'.

The information that is signaled outband associated with a retransmitted version of an RLC PDU in the preferred embodiment of the invention, is described below with reference to FIG. 5. Herein, the information is called a PDU reference number, as it indirectly indicates the initially transmitted version of the RLC PDU. The PDU reference number includes:

1) The FN used for the transmission of the first (initial) version of the PDU. This information is needed both for soft combining and deciphering at the receiver side.

2) Position in the TBS. In addition to the CFN which indicates the radio frame used for the initial transmission, this place information parameter is needed to indicate which of the transport blocks (TB) in the radio frame the RLC PDU in question was (one radio frame carries a transport block set (TBS) that may contain several TBs). Each transport block carries one RLC PDU. This information is needed only for soft combining at the receiver side.

3) The CFN Cycles. Since the CFN runs in cycles of 720 ms (equivalent to the 'superframe' cycle), some bits may be needed to indicate how many times the CFN has elapsed (i.e. how many times the HFN has been incremented) after the initial transmission of this PDU. The need of this parameter is dependent on the max allowed retransmission delay. If the maximum allowed delay is 720 msec, no CFN cycle parameter bits are needed. If the maximum allowed delay is 1440 ms, one CFN cycle parameter bit is needed, etc. At the receiver the current-HFN value is used or decreased according to the CFN cycle parameter, in order to get the HFN value used at the time of the initial transmission. In other words, from the CFN+CFN_cycle parameter the receiver can calculate the original PDU which should be soft-combined with the received data. From the same information the receiver can also calculate the UEFN (i.e. HFN+CFN) used for the original transmission. Said calculations can be implemented in the L1, MAC or RLC layer.

4) DCH id. In addition, if one outband channel is used to control several traffic channels (transport channels), the DCH id of the traffic channel to which the specific outband information refers to needs to be included. If the outband information (PDU reference number) is sent using the same physical channel as for data, no separate DCH id is needed.

Thus, in the preferred embodiment, the RLC PDU reference number comprises [CFN, position] in minimum. In general, outband signaling needs to carry something from which the CFN of the first transmission can be derived, but the information does not necessarily include the CFN itself. If the CFN cycle is not long enough, then the RLC PDU reference number=[CFN, position, CFN cycles]. If a common outband channel is used, the RLC PDU reference number=[CFN, position, CFN cycles, DCH id]. As the outband information can also be used for soft combining in L1, the RLC PDU number is no longer needed in outband information.

The above approach modifies the Type II/III Hybrid ARQ definitions, wherein a concrete RLC PDU number is used to identify the RLC PDUs for soft combining. If it is not acceptable to make this modification, i.e. to omit the RLC PDU number, then another possibility is to transmit the following outband signaling information: RLC PDU number+CFN+CFN cycles (if necessary). The RLC PDU is used in soft combining and the CFN cycles+CFN for deciphering on the receiver side. In this case the "Position in TBS" parameter is not needed in outband information, since it is not necessary for deciphering.

The exact time of the first version can be told as a physical time offset (ms) between the transmissions if the position of the packet within a frame can be given exactly in milliseconds or preferably as the number of full physical frames (10 ms)+the place within the frame.

In the following, an example of the transmission and retransmission of RLC PDUs is described with reference to FIGS. 6 and 7. The examples concern only the downlink direction but similar procedures can also be used in uplink transmission. The intention of the examples is not to show an optimal signaling solution for Hybrid Type II/III ARQ, but only to illustrate how the CFN-based ciphering can work together with Type II/III hybrid ARQ. If combining is based on the RLC PDU number, then it has to be transmitted outband in all transmissions, also in the initial transmission.

Figure 6:
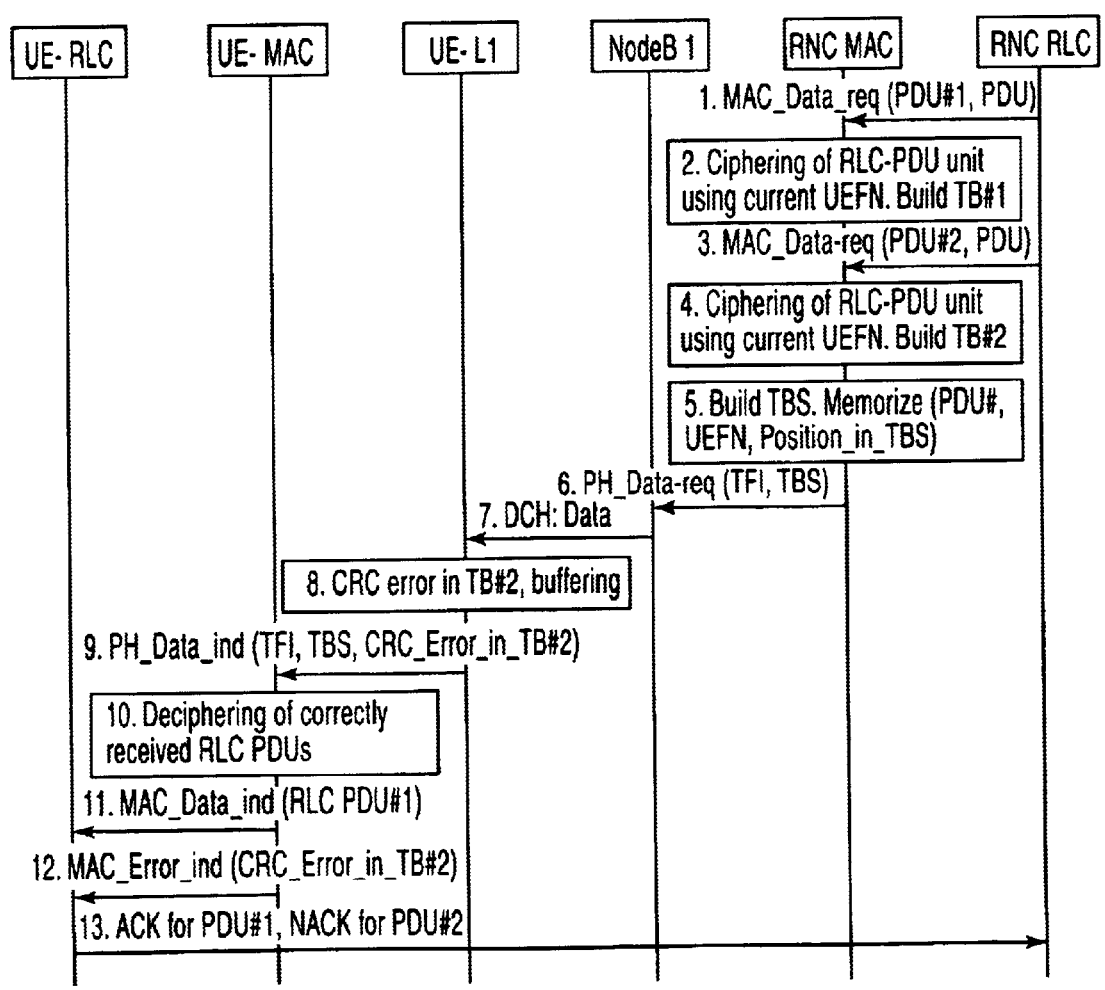
FIGS. 6 and 7 are signaling diagrams illustrating initial (first) transmission and retransmission of a RLC PDU utilizing Type II/III hybrid ARQ, respectively.

FIG. 6 illustrates an initial (first) transmission of RLC PDUs #1 and #2. In this example, the RLC sends two PDU's to the MAC within one transmission time interval, thus the TBS will contain both RLC PDUs, #1 and #2. In the following, the numbering refers to the numbering used in FIG. 6.

1–2. The RLC layer in the RNC sends an MAC_Data req containing the RLC PDU number (in example #1) and the RLC PDU to the MAC layer. RLC PDU#1 is ciphered using current UEFN, and TB#1 is built from the ciphered PDU and an optional MAC-header. The contents of the MAC header depend on the transport channel type used (common and dedicated channels have different MAC headers).

3–4. Similarly, within the same transmission interval, the RLC layer in the RNC sends another MAC_Data_req containing RLC PDU #2 to the MAC layer. RLC PDU#2 is ciphered and TB#2 built.

5. The MAC layer builds a Transport Block Set (TBS) containing two TBs, namely TB#1. and TB#2 in this example. The MAC also keeps, for each RLC PDU transmitted, a local table with at least the following information: [RAB#, PDU#, UEFN, Position_in_TBS].

6. The MAC sends the TBS together with a Transport Format Indicator (TFI) to layer 1. Layer 1 adds the CRC to each Transport Block (TB) in the TBS separately.

7. Data (TBS) is transmitted to the UE via Node B1 (a base station), or more generally via layer L1 of the radio access network (RAN), over the traffic channel DCH.

8. Layer 1 in the UE performs a CRC check for each TB and if a CRC error is noticed, the erroneous TB is buffered. In this example, the UE L1 detects a CRC error in TB#2 (corresponds to RLC PDU#2 in this example).

9. After L1 operations (e.g. channel decoding), UE L1 transfers the TBS to the MAC layer and indicates that TB#2 has a CRC error.

10. The UE MAC deciphers correctly received RLC PDUs (in this example only TB#1).

11. Correctly received and deciphered RLC PDUs are forwarded to the RLC.

12. CRC errors are indicated to the RLC. Depending on the RLC protocol details, it is also possible that errors do not need to be indicated to the MAC/RLC layers at all, but the RLC asks for retransmissions on basis of missing PDUs.

13. The UE RLC acknowledges (ACK) RLC PDU#1 and asks for retransmission of PDU#2 (a negative (NACK) or missing acknowledgement of PDU#2).

Figures 5, 7:
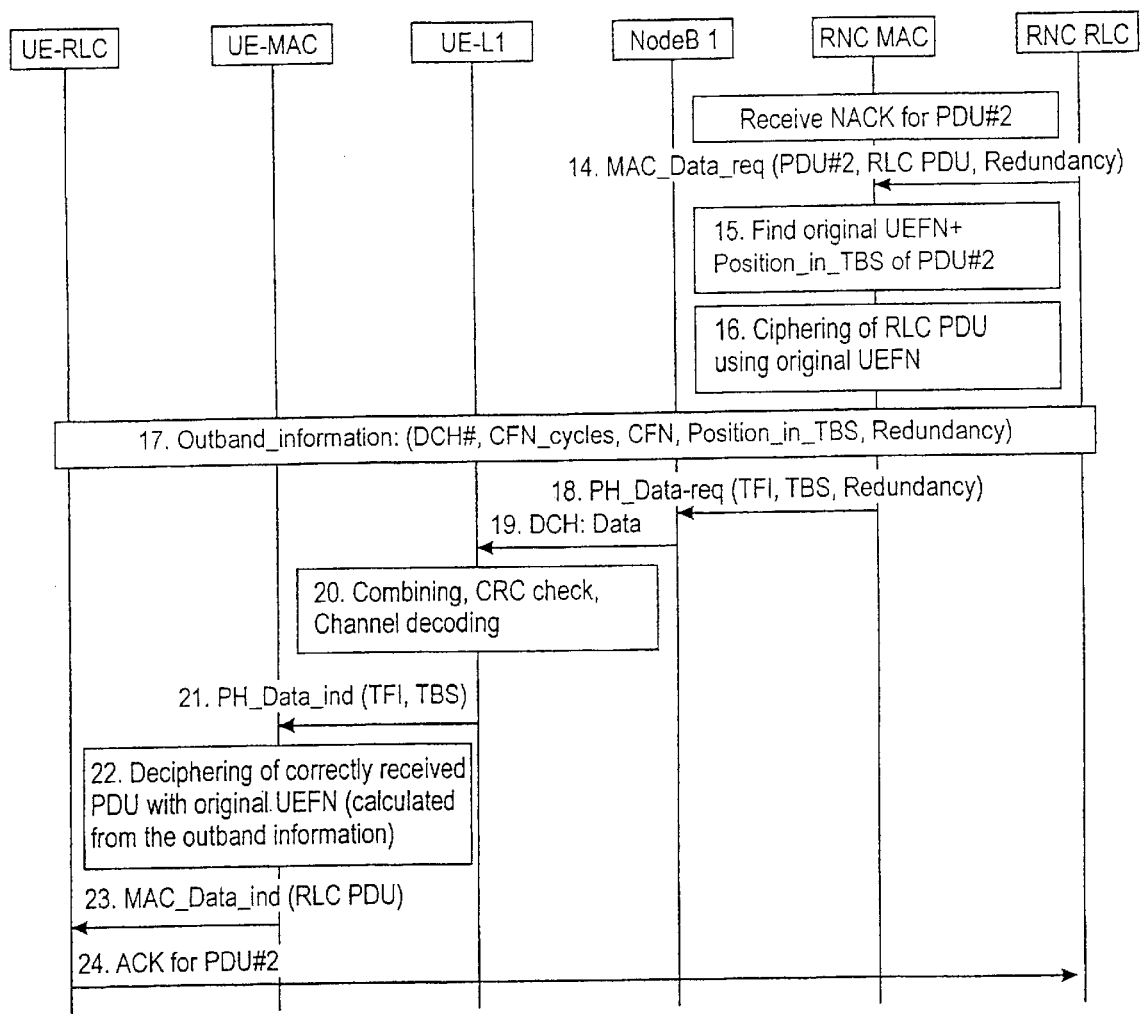
FIG. 5 illustrates outband information signaled associated with a retransmitted version of one RLC PDU.

FIG. 7 illustrates the retransmission of RLC PDUs #2. In the following, the numbering refers to the numbering used in FIG. 7.

14. The RNC RLC asks the MAC layer to transmit PDU#2, i.e. provides a MAC-Data-req containing the RLC PDU number (#2), the PDU itself and Redundancy information. From the existence of redundancy information, the MAC layer notices that this is a retransmission, and ciphering must be carried out with the UEFN information stored instead of the current UEFN. Actual redundancy information is needed on L1.

15. The MAC layer uses the RLC PDU number as an index and retrieves the UEFN and the Position_in_TBS used in the initial transmission of RLC PDU#2 and stored in the table.

16. The RNC MAC ciphers the RLC PDU using the UEFN used for initial transmission.

17. The required outband information (DCH#, CFN cycles, CFN, Position in TBS, Redundancy) is transmitted to receiver L1. There are several methods for transmitting 'outband information', but they are not relevant for this invention.

18. The data is transmitted to transmitter L1 with the guidance related to the redundancy information.

19. Data is transmitted to the UE.

20. Using the outband information, the layer L1 in the UE combines the retransmitted PDU#2 with the one buffered earlier. In other words, the UE L1 first searches for a TBS transmitted with the indicated CFN and with HFN=current HFN−CFN_cycles, and then searches for the buffered TB transmitted in the TBS found in the location indicated by the Position_in_TBS parameter. If the CRC of the combined PDU still fails, the combined PDU#2 may be buffered again and the retransmission may be repeated. In this example, however, it is assumed that the CRC check is successful, i.e. the retransmitted PDU#2 is correctly received. After a successful CRC check, layer 1 performs channel decoding.

21. UE L1 transfers the TBS containing PDU#2 to the MAC layer.

22. The UE MAC calculates the UEFN from the received outband information, i.e. UEFN=CFN+HFN', wherein HFN'=current HFN−CFN_cycles, and then deciphers the received PDU according to the calculated UEFN.

23. The received PDU#2 is transferred to the UE RLC layer. After receiving PDU#2 correctly, the UE RLC can acknowledge this to the peer entity, i.e. the RNC. It should be noted that whether acknowledgement is sent here or later depends on the ARQ method used.

In the soft combining described above, the transport blocks (e.g. MAC PDUS) to be combined are identical, including the user data, the MAC header and the RLC header in third generation mobile communications systems. As noted above, there may be a need to change some header information between the original transmission and the retransmission, such as a polling bit used as a request for an acknowledgement message. In an embodiment of the invention, in order to overcome this problem, the information that needs to be changed between the initial transmission and the retransmission(s) of a packet is sent outband with the other outband signaling information indicating the initial version of the packet.

The initial transmission of the packet may be exactly similar to that described above with reference to FIG. 6. The RLC header of the packet contains a polling bit with a first status indicating that an acknowledgement message is requested from the receiving end, i.e. the UE. In other words, the UE reads the polling bit from the inband RLC header, The retransmission of the packet is also similar to that described with reference to FIG. 7. However, the polling bit of the retransmitted packet should have a second status indicating that no acknowledgement message is required. The RNC MAC sends the initial RLC PDU with the first polling bit status as described above with reference to FIG. 7. Further, the outband information send by the RNC in step 17 also contains the new status of the polling bit. In the UE, steps 20, 21 and 22 are carried out as described above. In step 23, the UE-MAC may send to the UERLC a RLC PDU in which the status of the polling bit has been changed in accordance with the polling bit status in the outband information. Thus the RLC layer will proceed according to the new polling bit status. Alternatively, the UEMAC may give to the UE-RLC the initial (unchanged) RLC PDU, and the UERLC will use the polling bit status received with the outband information instead of the inband polling bit status in the RLC PDU.

The application has been described above by means of preferred embodiments to illustrate the principles of the invention. Regarding the details, the invention may vary within the scope and spirit of the accompanying claims.

What is claimed is:

1. A data transmission method in a communications system, comprising the steps of
   transmitting data packets from a transmitter to a receiver,
   using an automatic repeat request mechanism for retransmissions, said mechanism including combining initially transmitted and retransmitted versions of the data packet,
      sending, in association with each packet retransmission, outband signaling information which unambiguously indicates when the initial version of the data packet was transmitted,
      combining the retransmitted version of the data packet with at least the initial version of the data packet indicated by said outband signaling information at the receiver.

2. The method according to claim 1, wherein said outband signaling information indicates the exact time or physical location of the retransmission of the initial version of the data packet.

3. The method according to claim 1, further comprising transmitting said data packets by using frame number-based synchronizing, preferably connection frame number synchronization.

4. The claim according to claim 1, further comprising steps of
   ciphering each data packet at the transmitter according to a frame number used for the respective data packet in frame synchronization,
   deciphering each data packet at the receiver according to the same frame number as used for ciphering the respective data packet,
   ciphering any retransmitted version of the data packet according to the same frame number as used for ciphering the initially transmitted version of the data packet,
   deciphering the combined data packet according to the frame number included in said outband signaling information associated with the retransmitted version of the data packet.

5. The method according to claim 3, wherein said outband signaling information includes at least the frame number indicating a first data packet in a transmission frame in which the initial version of the data packet was transmitted, and the position of the initial version of the data packet within said transmission frame.

6. The method according to claim 3, wherein said outband signaling information includes the frame number indicating a first data packet in a transmission frame in which the initial version of the data packet was transmitted, and the position of the initial version of the data packet within said transmission frame, and the number of frame number cycles elapsed after the transmission of the initial version of the frame.

7. The method according to claim 4, wherein said outband information includes a data packet number of the initial version of the data packet and the frame number used for ciphering the initial version of the data packet.

8. The method according to claim 4, wherein said outband information includes a data packet number of the initial version of the data packet, and the frame number used for ciphering the initial version of the data packet, and the number of frame number cycles elapsed after the transmission of the initial version of the frame.

9. The method according to claim 1, wherein the data packet is a radio link control layer (RLC) protocol data unit (PDU) in a mobile communication system.

10. The method according claim 1, wherein said information on the position of the data packet in the transmission frame indicates the position of the data packet in a transfer block set (TBS).

11. The method according claim 1, further comprising:
   sending the retransmitted version of the packet with an inband information content indentical to that of the initial version of the packet,
   sending with said outband information such band information on the retransmitted version of the packet which needs to be changed in relation to the corresponding inband information of the initial version of the packet,
   soft combing the indentical initial and retransmitted versions of the packet,
   replacing with the inband information received with the outband information the corresponding inband information received in the retransmitted version of the packet. content identical to that of the initial version of the packet.

12. The method according to claim 11, wherein
   said inband information is inband header information, such as medium access control (MAC) header information or radio link access control (RLC) header information.

13. The method according to claim 12, wherein said inband header information includes a bit used to request an acknowledgement message, such as a polling bit.

14. A communications system, comprising
   means for transmitting data packets from a transmitter to a receiver,
   an automatic repeat request mechanism for retransmissions, said mechanism including combining initially transmitted and retransmitted versions of the data packet,
      means for sending, in association with each packet retransmission, outband signaling information which unambiguously indicates when the initial version of the data packet was transmitted,
      means for combining the retransmitted version of the data packet with at least the initial version of the data packet indicated by said outband signaling information at the receiver.

15. The system according to claim 14, wherein said outband signaling information indicates the exact time or physical location of the transmission of the initial version of the data packet.

16. The system according to claim 14, wherein the transmission of said data packets is arranged to use frame number-based synchronization, preferably connection frame number-based synchronization.

17. The system according to claim 14, further comprising
   means for ciphering each data packet at the transmitter according to a frame number used for the respective data packet in frame synchronization,
   means for deciphering each data packet at the receiver according to the same frame number as used for ciphering the respective data packet at the transmitter,
   means for ciphering any retransmitted version of the data packet according to the same frame number as used for ciphering the initially transmitted version of the data packet,
   means for deciphering the combined data packet according to the frame number included in said outband signaling information associated with the retransmitted version of the data packet.

18. The system according to claim 16, wherein said outband signaling information includes at least the frame number indicating a first data packet in a transmission frame in which the initial version of the data packet was transmitted, and the position of the initial version of the data packet within said transmission frame.

19. The system according to claim 16, wherein said outband signaling information includes the frame number indicating a first data packet in a transmission frame in which the initial version of the data packet was transmitted, and the position of the initial version of the data packet within said transmission frame, and the number of frame number cycles elapsed after the transmission of the initial version of the frame.

20. The system according to claim 17, wherein said outband information includes a data packet number of the initial version of the data packet and the connection frame number used for ciphering the initial version of the data packet.

21. The system according to claim 17, wherein said outband information includes a data packet number of the initial version of the data packet, and the frame number used for ciphering the initial version of the data packet, and the number of frame number cycles elapsed after the transmission of the initial version of the frame.

22. The system according claim 15, wherein the data packet is a radio link control layer (RLC) protocol data unit (PDU) in a mobile communication system.

23. The system according to claim 15, wherein said information on the position of the data packet in the transmission frame indicates the position of the data packet in a transfer block set.

24. The system according to claim 15, wherein
the inband information content of the retransmitted version of the packet is identical to that of the initial version of the packet, in order to enable soft combining in the receiver,
said outband information includes such inband information on the retransmitted version of the packet which needs to be changed in relation to the corresponding inband information on the initial version of the packet,
said inband information received with the outband information overrides the corresponding inband information received in the retransmitted version of the packet.

25. The system according to claim 24, wherein said
inband information is inband header information, such as medium access control (MAC) header information or radio link access control (RLC) header information.

26. The system according to claim 25, wherein said inband header information includes a bit used as a request for an acknowledgement message, such as a polling bit.

27. A transmitter unit in a communications system, comprising
means for transmitting data packets to a receiver,
an automatic repeat request mechanism for retransmissions,
means for sending, in association with each packet retransmission, outband signaling information which unambiguously indicates when the initial version of the data packet was transmitted, in order to enable the receiver to combine the retransmitted version of the data packet with at least the initial version of the data packet indicated by said outband signaling information at the receiver.

28. The transmitter unit according to claim 27, wherein said outband signaling information indicates the exact time or physical location of the transmission of the initial version of the data packet.

29. The transmitter unit according to claim 27, wherein the unit is arranged to use frame number-based synchronization, preferably connection frame-based synchronization.

30. The transmitter unit according to claim 27, wherein the unit is arranged to use frame number-based ciphering for the data packets, the unit is arranged to cipher any retransmitted version of the data packet according to the same frame number as used for ciphering the initially transmitted version of the data packet, and to indicate the frame number to the receiver for deciphering.

31. The transmitter according to claim 27, wherein
the transmitter is arranged to send the retransmitted version of the packet with an inband information content identical to that of the initial version of the packet,
the transmitter is arranged to send with said outband information such inband information on the retransmitted version of the packet which needs to be changed in relation to the corresponding inband information on the initial version of the packet.

32. A receiver unit in a communications system, comprising
means for receiving data packets from a transmitter,
an automatic repeat request mechanism for retransmissions, said mechanism including combining initially transmitted and retransmitted versions of the data packet,
means for receiving from the transmitter, in association with each packet retransmission, outband signaling information which unambiguously indicates when the initial version of the data packet was transmitted,
means for combining the retransmitted version of the data packet with at least the initial version of the data packet indicated by said outband signaling information.

33. The receiver unit according to claim 32, wherein said outband signaling information indicates the exact time or physical location of the transmission of the initial version of the data packet.

34. The receiver unit according to claim 32, wherein the unit is arranged to use frame number-based synchronization, preferably connection frame number-based synchronization.

35. The receiver unit according to claim 32, wherein the unit is arranged to use frame number-based ciphering for the data packets, the unit is arranged to decipher any retransmitted version of the data packet according to a frame number included in said outband signaling information.

36. The receiver unit according to any one of claim 32, wherein
the inband information content of the retransmitted version of the packet is identical to that of the initial version of the packet, in order to enable a soft combining in the receiver,
said outband information includes such inband information on the retransmitted version of the packet which needs to be changed in relation to the corresponding inband information on the initial version of the packet,
the receiver unit is arranged to use said inband information received with the outband information instead of the corresponding inband information received in the retransmitted version of the packet.

* * * * *